United States Patent
Niessen et al.

(10) Patent No.: US 6,493,292 B1
(45) Date of Patent: Dec. 10, 2002

(54) DEVICE FOR SCANNING AN INFORMATION CARRIER AND METHOD OF OPERATING SUCH A DEVICE

(75) Inventors: Arnoldus Jeroen Niessen, Eindhoven (NL); Marcel Rieck, Eindhoven (NL); Jeroen Wals, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 176 days.

(21) Appl. No.: 09/613,233

(22) Filed: Jul. 10, 2000

(30) Foreign Application Priority Data

Jul. 8, 1999 (EP) .............................................. 99202219

(51) Int. Cl.$^7$ ................................................ G11B 7/00
(52) U.S. Cl. ................................. 369/30.17; 369/30.12
(58) Field of Search ............................ 369/30.12, 30.13, 369/30.16, 30.17, 47.45, 47.49

(56) References Cited

U.S. PATENT DOCUMENTS

| | | | |
|---|---|---|---|
| 4,884,259 A | * 11/1989 | Horikawa et al. | 369/32 |
| 5,020,047 A | * 5/1991 | Hamer et al. | 369/32 |
| 5,268,885 A | 12/1993 | Akkermans | 369/44.29 |
| 5,402,401 A | 3/1995 | Akkermans | 369/44.28 |
| 5,677,899 A | 10/1997 | Getreuer | 369/44.28 |
| 5,745,460 A | * 4/1998 | Tateishi | 369/58 |
| 6,320,825 B1 | * 11/2001 | Bruekers et al. | 369/32 |

FOREIGN PATENT DOCUMENTS

JP 07176173 A 7/1995

OTHER PUBLICATIONS

PHN 17,032, US. Serial No. 09/357,271.

* cited by examiner

*Primary Examiner*—Nabil Hindi
(74) *Attorney, Agent, or Firm*—Michael E. Belk

(57) ABSTRACT

A device according to the invention is suitable for scanning an information carrier with tracks around an axis. The device has means for transferring information to/from a scanning spot on the information carrier. The device has tangential displacement means for moving the scanning spot in a tangential direction and radial displacement means for moving the scanning spot in a radial direction. The device has control means for controlling the radial displacement means and radial position measurement means for generating a radial position signal ($\cos(9\beta_r)$, $\sin(9\beta_r)$) which is a measure of the instantaneous radial position of the scanning spot. The device has a scanning mode in which the scanning spot follows a track and a displacement mode in which tracks are crossed. The device according to the invention is characterized by tangential position detection means for generating a tangential position signal ($S_\alpha$) which is indicative of the tangential position ($\alpha$) of the scanning spot. With the aid of the control means it is achieved that in the displacement mode the scanning spot is moved in a radial direction. The displacement is effected in a time interval having a radial displacement time ($T_r$) which is a function of the difference between a desired tangential position ($\alpha_e$) and an instantaneous tangential position ($\alpha_b$).

16 Claims, 6 Drawing Sheets

DEVICE FOR SCANNING AN INFORMATION CARRIER AND METHOD OF OPERATING SUCH A DEVICE

BACKGROUND OF THE INVENTION

1. Technical Field

The invention relates to a device for scanning an information carrier having tracks around an axis, which device has means for transferring information from/to a scanning spot on the information carrier and has tangential displacement means for moving the scanning spot in a tangential direction and radial displacement means for moving the scanning spot in a radial direction, which device has control means for controlling the radial displacement means and has radial position measurement means for generating a radial position signal which is a measure of the instantaneous radial position of the scanning spot, which device has a scanning mode, in which the scanning spot follows a track, and a displacement mode, in which the scanning spot is moved in a radial direction and tracks are crossed.

The invention further relates to a method of operating such a device.

2. Related Art

A device of the type defined in the opening paragraph is known from U.S. Pat. No. 5,402,401. The device is suitable for reading and/or writing audio/video and/or file information from/onto a rotating information carrier such as a Compact Disc. In the scanning mode of the known device the radial error signal serves as a radial position signal. This radial position signal is used for centering the scanning spot on a track. In the displacement mode the scanning spot is moved in a radial direction in accordance with a predetermined velocity profile. On the one hand, a short duration of the displacement mode is desirable in order to obtain a short latency time between successive scanning modes and, consequently, an optimum efficiency of the information transfer. On the other hand, it is advantageous to effect the radial movement of the scanning spot comparatively slowly in order to limit the power consumption, noise production and wear in the displacement mode. A low power consumption is of particular importance for portable equipment.

SUMMARY OF THE INVENTION

It is an object of the invention to provide a device of the type defined in the opening paragraph, in which device the velocity of movement of the scanning spot can be limited without a consequent increase of the latency time. For this purpose, according to the invention, the device of the type defined in the opening paragraph is characterized in that the device further has tangential position measurement means for generating a tangential position signal which is indicative of the tangential position of the scanning spot, the control means causing the scanning spot to be moved in the radial direction in the displacement mode in a time interval with a radial displacement time which is a function of the difference between a desired tangential position and a current tangential position. This makes it possible to adapt the velocity of the movement in a radial direction to the duration of the time interval necessary to reach the desired tangential position. The invention is based on the recognition of the fact that it is not useful to move the scanning spot so rapidly that this scanning spot has already reached the desired radial position well before the desired tangential position is reached.

Since the scanning spot is moved to a desired radial position in a time interval longer than a minimum time interval, radial displacement requires less power and leads to a reduced noise production and a reduced wear. On the other hand, the rate at which information transfer from/to the information carrier is possible is not adversely affected because the radial displacement time is selected so as to allow for the difference between the desired tangential position and the current tangential position, as a result of which the desired radial and tangential positions are not reached any later than in the case that the radial movement is effected within the shortest possible length of time.

It is to be noted that from JP 07-176173 an apparatus is known in which a rotation signal which is indicative of a rotation of the information carrier is used for the correction of a counting signal. Thus, it is precluded that the rotation of an information carrier having spiral tracks leads to track counting errors.

In the device in accordance with the invention the control means provide a movement of the scanning spot over a similar radial distance in a comparatively long first radial displacement time and a comparatively short second radial displacement time for a comparatively small first difference and a comparatively large second difference in tangential positions.

In an embodiment of the device in accordance with the invention the control means include first control means for generating a signal which is indicative of the desired instantaneous position as a function of the time, second control means for generating an error signal which is indicative of a difference between the desired instantaneous position and the instantaneous position, and third control means for generating a control signal for the radial displacement means. This embodiment makes it possible to realize the radial movement within narrow tolerances within the radial movement time.

A variant of said embodiment is characterized in that the control means include fourth control means for generating a prediction signal which corresponds to an expected value of the control signal and include signal combination means for generating the control signal from the error signal and the prediction signal. This variant provides a very stable control of the radial displacement means in that only a small amplification of the error signal is necessary.

An embodiment is characterized in that the radial position measurement means have detection means coupled to the displacement means. The device may include, for example, a memory for storing a relationship between values of a detection signal generated by the detection means and numbers of tracks of the information carrier, so that it is known to which track a given value of the detection signal corresponds. Conversely, the track corresponding to a detection signal value can be calculated if the variations in track pitch are sufficiently small.

In an embodiment the radial position measurement means include track crossing counting means for generating a counting signal which is indicative of a number of tracks crossed, means for generating a tracking error signal which is indicative of the distance of the scanning spot from the nearest track, and means for generating a radial position signal from the counting signal and the tracking error signal. In this way, the radial position of the scanning spot can be determined accurately.

In the case of information carriers having continuous spiral tracks, in contradistinction to separate circular tracks, the counting signal is influenced by the rotation of the information carrier. For use with an information carrier having spiral tracks the device preferably has correction means for correcting the counting signal on the basis of the tangential position signal.

In accordance with the invention a method of operating a device for scanning an information carrier having tracks around an axis, in which method the information carrier is rotated about the axis, which method comprises a scanning mode in which information is transferred from/to a scanning spot on the information carrier and in which the scanning spot is moved along a track, and displacement mode in which the scanning spot is moved in a radial direction and in which tracks are crossed, is characterized in that in the displacement mode the scanning spot is moved in the radial direction in a time interval with a radial displacement time which is a function of the difference between a desired tangential position and a current tangential position.

BRIEF DESCRIPTION OF THE DRAWINGS

These as well as further aspects of the invention will be described in more detail with reference to the drawings. In the drawings.

DETAILED DESCRIPTION OF THE INVENTION

Figure 1:
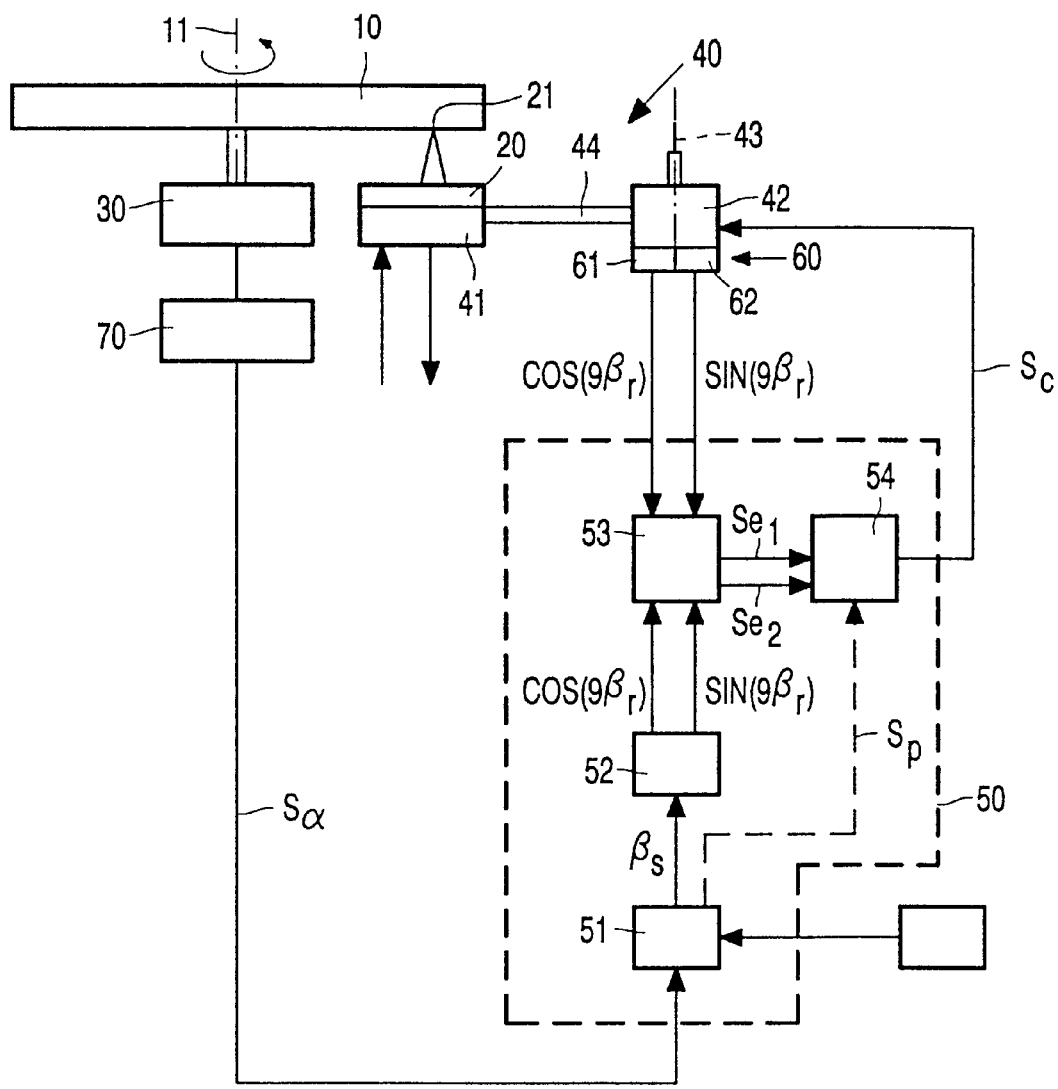
FIG. 1 shows a device in accordance with a first embodiment of the invention, a device in accordance with a first embodiment of the invention.

FIG. 1 show a device for scanning an information carrier 10 having tracks around an axis 11. In the present case the information carrier is an optical information carrier but may alternatively be of a magneto-optical or magnetic type. The device has means 20 for transferring information from/to a scanning spot 21 on the information carrier 10. In the present embodiment said means 20 are formed by an opto-electrical transducer, for example a transducer as described in U.S. Pat. No. 5,402,401. The transducer 20 converts an optical pattern scanned by the scanning spot 21 into an electrical signal and thereby transfers information from the information carrier 10. Alternatively, a transducer may be used which is (in addition) suitable for writing an optical pattern onto the information carrier in response to an electrical write signal so as to transfer information to the information carrier.

The device further has tangential displacement means 30 for displacing the scanning spot 21 with respect to the information carrier 10 in a tangential direction. In the present case the tangential displacement means 30 are realized by means of a motor which rotates the information carrier 10 about the axis 11.

The transducer 20 is carried by a slide 41, which is driven by a slide motor 42 having a shaft 43. At least a part of the transducer 20 is radially movable with respect to the slide 41 (not shown). In this way a fine-positioning mechanism is obtained. A transmission mechanism 44 converts a rotary movement of the shaft 43 of the slide motor 42 into a radial movement of the slide 41 in a direction transverse to the tracks of the information carrier 10. The slide 41, the slide motor 42 and the transmission mechanism 44 form radial displacement means 40.

In the present embodiment radial position measurement means 60 are formed by Hall sensors 61, 62. The Hall sensors 61, 62 generate a signal $\cos(9\beta_r)$ and $\sin(9\beta_r)$, respectively, which are indications of the cosine and sine of a multiple (9×) of the angle $\beta_r$ occupied by the shaft 43 of the slide motor 42. Since the shaft 43 of the slide motor 42 is coupled to the slide 41 the two signals together form a composite radial position signal which is a measure of the instantaneous radial position r of the scanning spot 21. The slide motor 42 is controlled by control means 50. In the present embodiment the control means 50 comprise first control means 51, formed by a microprocessor, which generates a signal $\beta_s$. The signal $\beta_s$ is a measure of the angle of the shaft of the slide motor 42, which angle corresponds to the desired instantaneous position as a function of time. Thus, the signal $\beta_s$ is indicative of the desired instantaneous position as a function of time. With the aid of a Table 52 signals $\cos(9\beta_r)$, $\sin(9\beta_r)$ are generated, which signals represent the cosine and the sine of a multiple (9×) of this angle. A quadrature detector 53 generates a composite signal Se1, Se2 from the signals of the Table 52 and the signals from the Hall sensors 61, 62, the signal thus generated being indicative of a difference between the desired instantaneous position and the instantaneous position. The error signal is made up of a first component Se1 which is indicative of the value $\sin(9*(\beta_s-\beta_r))$ and a second component Se2 which is indicative of the value $\lfloor(\beta_s-\beta_r)/2\pi\rfloor$. The Table 52 and the quadrature detector 53 form second control means. With the aid of third control means 54, formed by a PID controller, a control signal for the radial displacement means is derived from the error signal. The second control means 52, 53 and the third control means 54 are described in greater detail in the prior Application PHN 17.032.

Figure 1A:
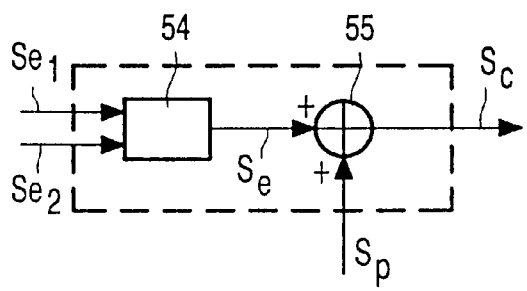
FIG. 1A shows a detail of the device shown in FIG. 1.

The control means 50 may further include fourth control means, which are for example also formed by the microprocessor 51, by means of which a prediction signal Sp is generated which corresponds to an expected value of the control signal Sc. In this case the signal combination means 55 generate the control signal Sc from the error signal Se and the prediction signal Sp (see FIG. 1A).

The device has a scanning mode in which the scanning spot 21 follows a track of the information carrier 10. The device also has a displacement mode in which the scanning spot 21 is moved in a radial direction and the tracks are crossed. There are various possibilities of combining the fine-positioning mechanism with the radial displacement means 41, 42, 44. In the scanning mode a servo-system can cause the fine-positioning mechanism to rapidly eliminate deviations between the actual position and the desired position of the scanning spot. This servo-system is further capable of eliminating an average deviation of the fine-positioning mechanism with respect to a rest position by moving the slide 41 gradually or in steps. During the displacement mode the fine-positioning mechanism can be held in its rest position.

The device in accordance with the invention has tangential position measurement means 70 for generating a tangential position signal $S_\alpha$ which is indicative of the tangential position of the scanning spot 21 with respect to the information carrier. In the present case the tangential position signal $S_\alpha$ is a pulsating signal, each pulse representing $1/256^{th}$ part of one revolution of the information carrier 10.

Figure 2:
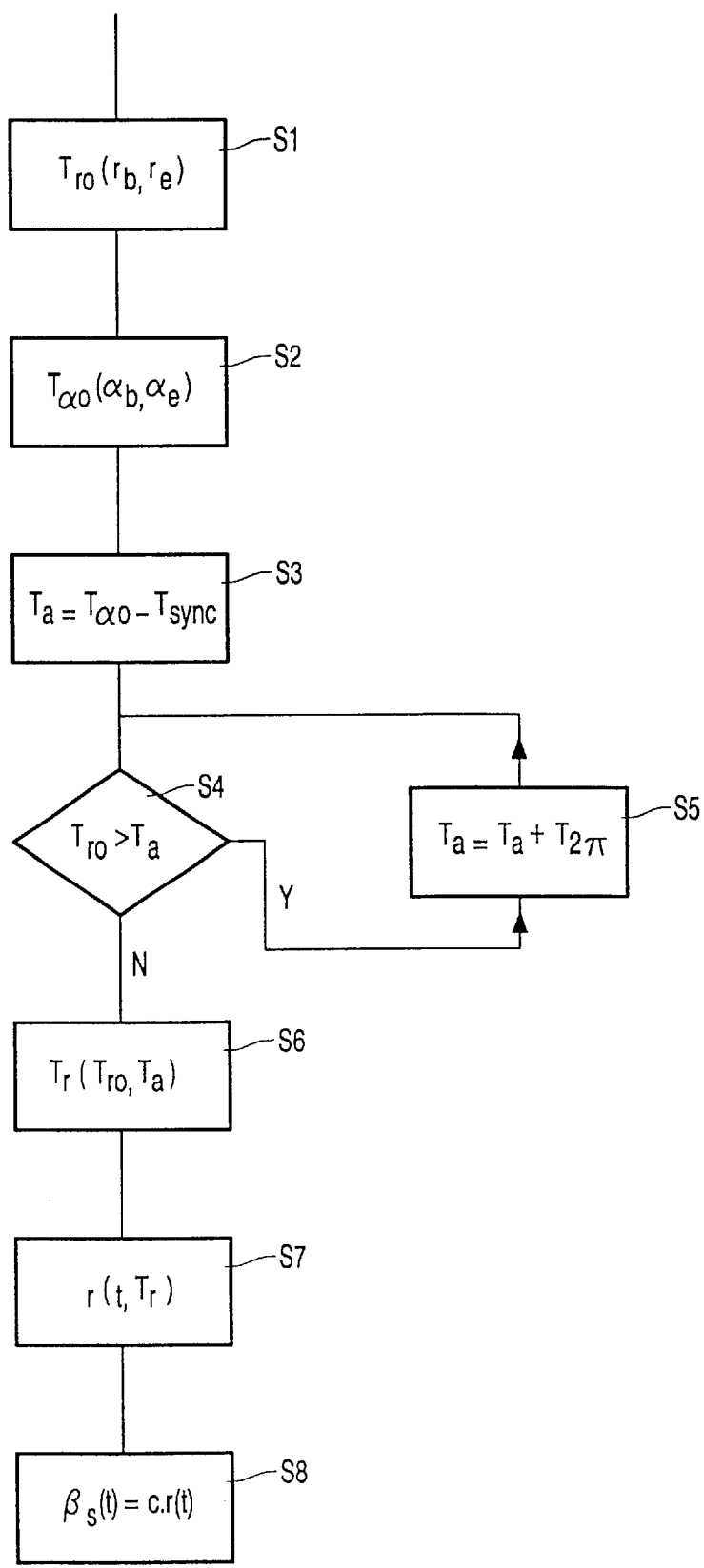
FIG. 2 illustrates a method in accordance with the invention, FIGS. 3A, 3B and 3C respectively show the acceleration, the deceleration and the excursion of the scanning spot in an embodiment as functions of time.

In the device in accordance with the invention the control means 50 cause the scanning spot 21 to be moved in the radial direction in the displacement mode in a time interval with a radial displacement time Tr which is a function of the difference between a desired tangential position $\alpha_e$ and a current tangential position $\alpha_b$. This is clarified with reference to FIG. 2. FIG. 2 illustrates the calculation of the value of the signal $\beta_s$ by the first control means formed by the microprocessor 51.

Figure 3A:
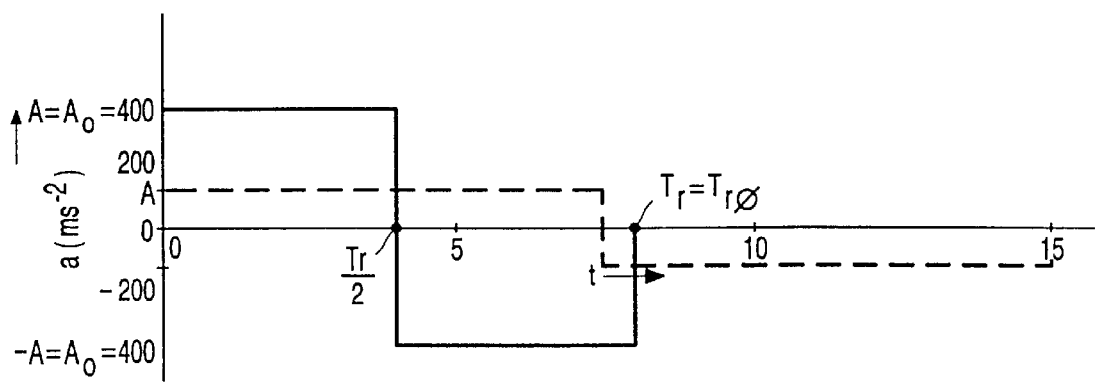
Figure 3B:
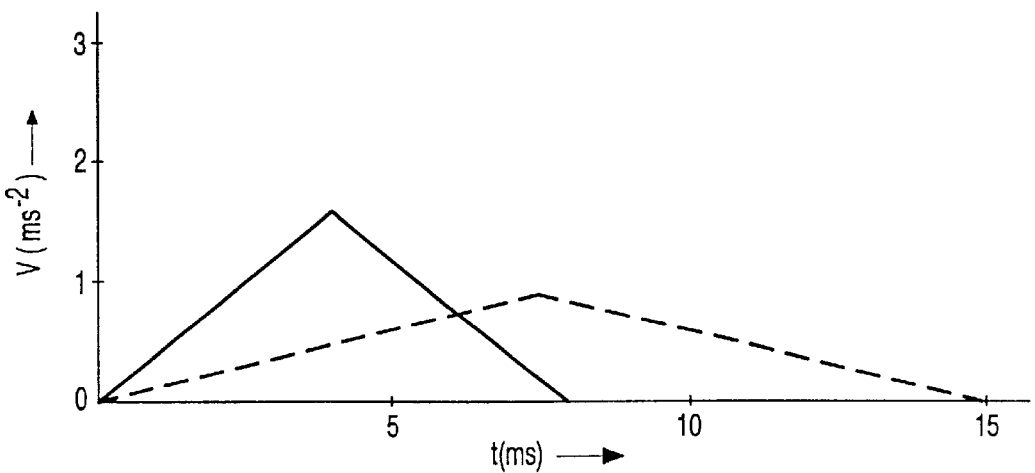
Figure 3C:
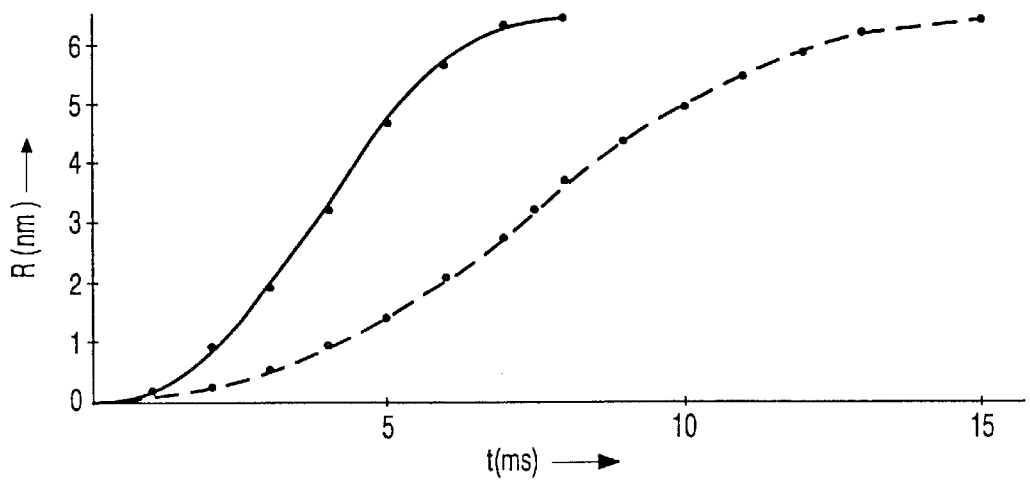

In a step S1 a minimum radial displacement time $T_{r0}$ is calculated for the radial movement of the scanning spot 21 from the radial starting position $r_b$ to the radial end position $r_e$. In the present embodiment the scanning spot 21 is uniformly accelerated with an acceleration A during a first time interval from 0 to $T_r/2$ and is uniformly decelerated with a deceleration −A during a second time interval $T_r/2$, as is shown in FIG. 3A. In FIG. 3A a solid curve represents the movement for a maximum acceleration $A=A_0$ and a dashed curve represents an example of a movement in the case of an acceleration $A<A_0$. The resulting velocity v and the resulting travel R as a function of the time t are shown in FIG. 3B and in FIG. 3C, respectively. The travel R in a time interval from 0 to $T_r$ is $$R=1/4.A.T_r^2. \quad (1)$$

In the present embodiment the minimum radial displacement time $T_{r0}$ is determined by a maximum permissible acceleration $A_0$ in accordance with the relationship:

$$T_{r0}=2\sqrt{R/A_0}, \quad (2)$$

where $R=r_e-r_b$.

In a step S2 the minimum rotation time $T_{\alpha 0}$ is calculated. In the present embodiment, in which the information carrier is rotated with a constant velocity the minimum rotation time is $$T_{\alpha 0}=(\alpha_e-\alpha_b)/2\pi\omega, \quad (3)$$

where $\alpha_e$ is the desired tangential position, $\alpha_b$ is the angle at the beginning of the movement, and $\omega$ is the angular velocity of the information carrier.

In a step S3 an auxiliary variable $T_a$ is equalized to the minimum rotation time $T_{\alpha 0}$ minus a time $T_{sync}$ required for synchronization, where $T_{sync}$ is greater than or equal to 0. The time required for synchronization can, for example, be equal to 0 if the information to be read starts with a header, the device being synchronized while the header is read.

In a step S4 the minimum radial displacement time $T_{r0}$ is compared with the auxiliary variable $T_a$. If the minimum radial displacement time $T_{r0}$ is greater than the auxiliary variable $T_a$ the auxiliary variable $T_a$ is incremented by a value $T_{2\pi}$ in a step S5. Here, $T_{2\pi}$ is the length of time for one full revolution of the information carrier 10. In the case that during the displacement the information carrier 10 is rotated with a constant angular velocity $\omega$ it holds that $T_{2\pi}=1\omega$. In the case that the angular velocity depends on the radial position of the scanning spot 21 on the information carrier and the angular velocity is adapted during the displacement the time $T_{2\pi}$ can be calculated from a predicted variation of the angular velocity. The same holds for the calculation of $T_{\alpha 0}$. After the step S5 the step S4 is repeated.

If the minimum radial displacement time $T_{r0}$ is smaller than or equal to the auxiliary variable $T_a$, a step S6 is carried out. In this step the radial displacement time $T_r$ is set to a value which is at least dependent on the value of the auxiliary variable. The value $T_r$ thus set complies with $T_{r0}<=T_r<=T_a$. Specifically for the present embodiment it holds that: $T_r=T_a$.

Subsequently, a path is calculated for moving the scanning spot 21 from the starting position $r_b$ to the end position $r_e$. The path depends on pre-imposed additional conditions. In the present embodiment the acceleration A complies with:

$$A=A_0.(T_{r0}/T_r)^2. \quad (4)$$

The desired path of movement, i.e. the desired location of the scanning spot 21 as a function of the time t complies with $$r(t,\ T_r)=r_b+A/2.t^2 \text{ for } 0<=t<=T_r/2, \text{ en} \quad (5a)$$

$$r(t,\ T_r)=r_b+A/4.T_r^2+A.T_r.t-A/2.t^2 \text{ for } T_r/2<=t<=T_r. \quad (5b)$$

In a step S8 the angle $\beta_s$ is calculated which corresponds to the desired location of the scanning spot r as a function of the time t.

Figure 4:
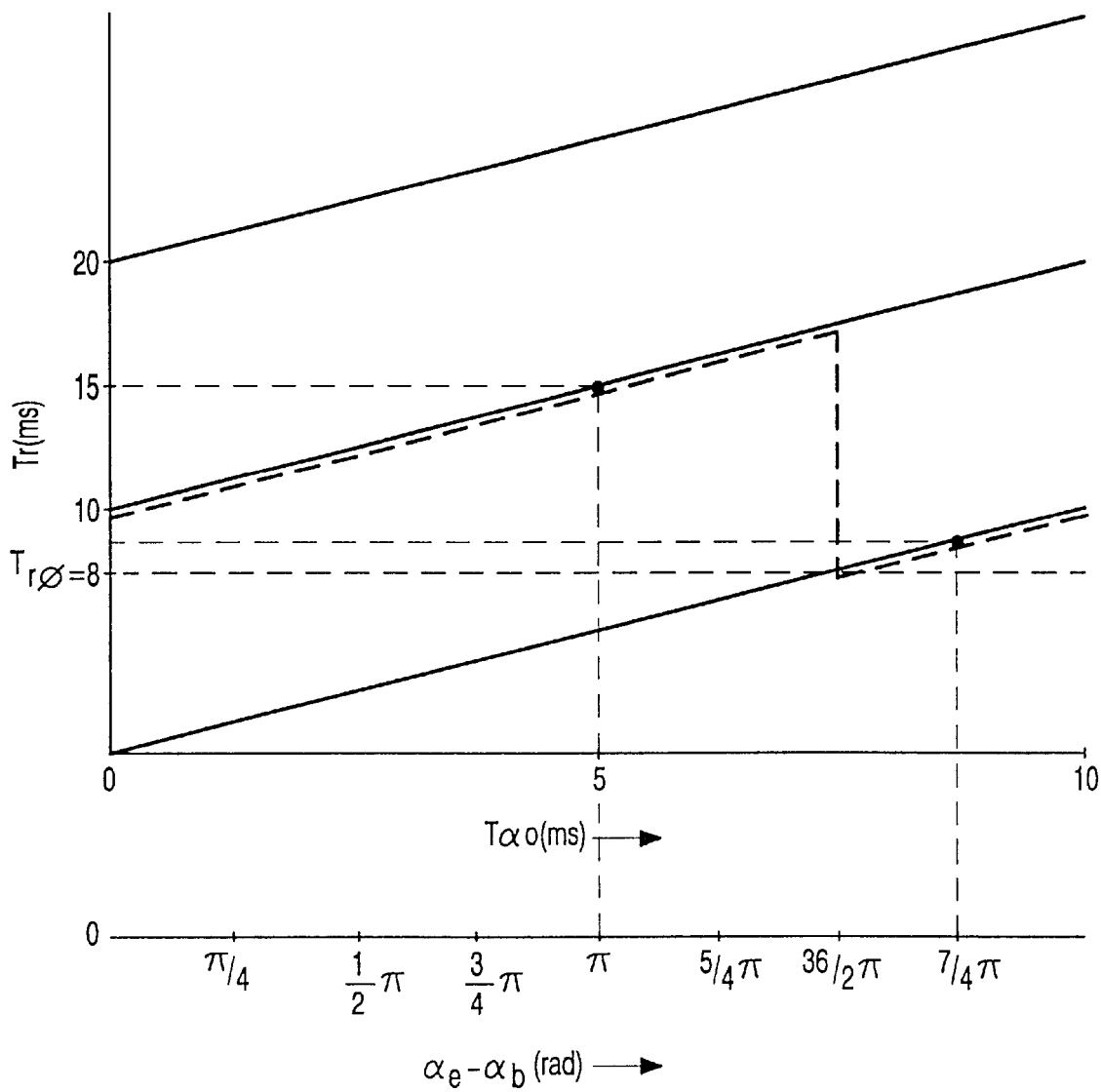
FIG. 4 illustrates the relationship between the current and the desired tangential position, the time required to reach the tangential position, and the radial displacement time, FIGS. 5A, 5B and 5C respectively show the acceleration, the deceleration and the excursion of the scanning spot in a further embodiment as functions of time.

FIG. 4 by way of example shows the relationship between the radial displacement time Tr (dashed curve) and the difference between the desired tangential position $\alpha_e$ and the current tangential position $\alpha_b$ for a situation in which the minimum radial displacement time $T_{r0}$ is 8 ms and in which the information carrier 10 is rotated with a constant angular velocity of 100 Hz. In the present example it is further assumed that the maximum attainable acceleration $A_0$ is 400 ms$^{-2}$ and that in the displacement mode the scanning spot 21 is moved over a radial distance $\alpha_e-\alpha_b$ of $\pi$ radians. From the calculation in step S1 of the method illustrated in FIG. 4 it then follows that the minimum radial displacement time $T_{r0}$ for a movement over a radial distance of 6.4 mm is 8 ms. At a constant angular velocity $\omega$ van 100 Hz, the duration $T_{2\pi}$ of 1 revolution is 10 ms. For an angle to be traversed $\alpha_e-\alpha_b$ of $\pi$ radians it is calculated in the step S2 that the minimum rotation time $T_{\alpha 0}$ is 5 ms. If it is assumed that the time $T_{sync}$ for synchronization is negligibly small, the auxiliary variable $T_a$ is initialized at the value $Ta=T_{\alpha 0}=5$ ms in the step S3. From the comparison in the step S4 it now follows that the value of the minimum radial displacement time $T_{r0}$ is greater than the value of the auxiliary variable $T_a$. The value of the auxiliary variable $T_a$ is now incremented by the duration $T_{2\pi}=10$ ms of 1 revolution to $T_a=15$ ms. After the step S4 has been repeated the step S6 is now carried out, in which the radial displacement time $T_r$ is set to $T_r=T_a=15$ ms. In the step S7 the associated path of movement is now calculated with the aid of the formula 5a and the formula 5b. From formula 4 it follows that the acceleration A of the scanning spot 21 is then limited to 114 ms$^{-2}$. This reduces the power required for the radial movement to 28% of the power required for the movement in the case of a maximum acceleration $A_0$ and this is not achieved at the expense of a longer access time. Likewise, a radial displacement time $T_r=8.75$ ms is calculated for an angle to traversed $\alpha_e-\alpha_b$ of $7/4.\pi$ radians and a similar radial distance of 6.4 mm. In this case the acceleration A of the scanning spot is limited to 365 m.s$^{-2}$, which is also achieved without an increase in access time. The power required for the radial movement is then reduced to 84% of the power required for a radial movement in the case of a maximum acceleration $A_0$ of the scanning spot 21. It follows from the foregoing that there is for a comparatively small first difference ($\pi$) and a comparatively large second difference ($7/4*\pi$) in tangential positions ($\alpha_e-\alpha_b$) for which a movement of the scanning spot 21 over a similar radial distance (6.4 mm) is achieved in a comparatively long first radial displacement time (15 ms) and a comparatively short second radial displacement time (8.75 ms).

Figure 5A:
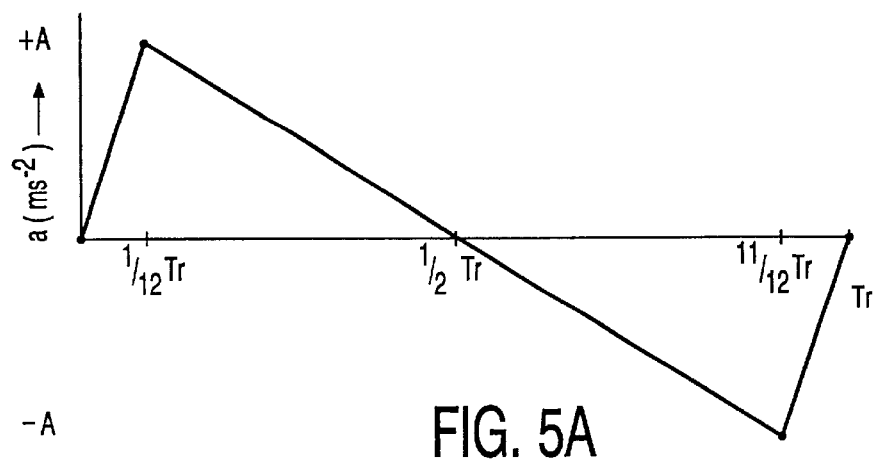
Figure 5B:
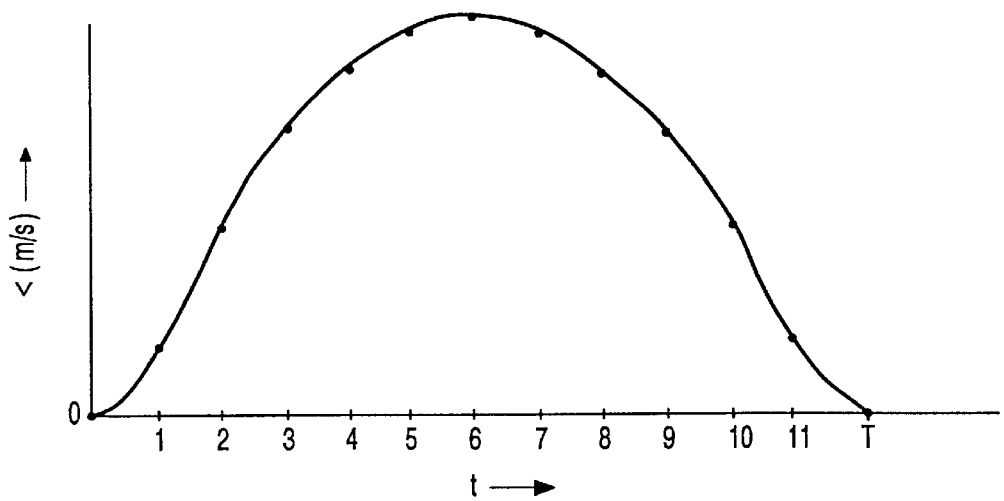
Figure 5C:
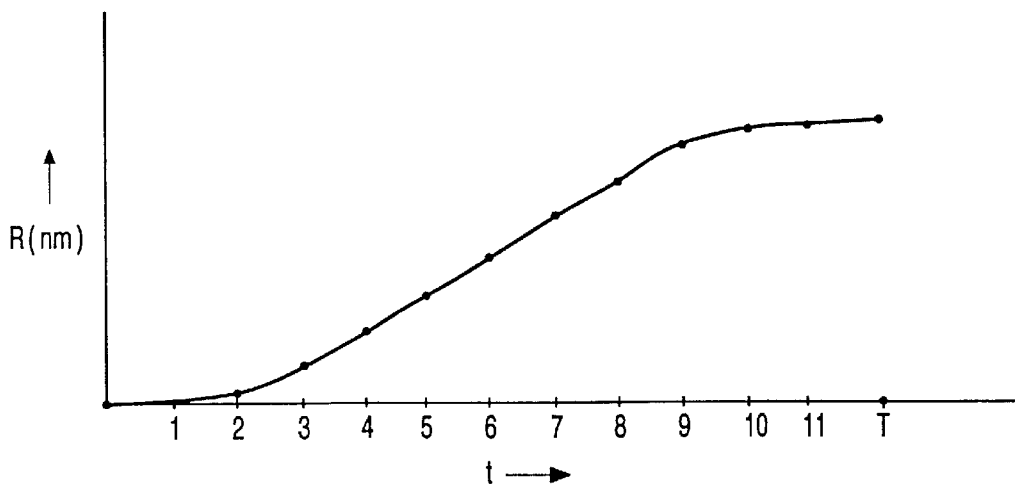

In another embodiment the acceleration a of the scanning spot 21 during the displacement of the scanning spot varies as shown in FIG. 5A. In this embodiment the acceleration a increases linearly from 0 to a value A in a first time interval from $T_r/12$ to $11/12*T_r$. In the time interval from $11/12*T_r$ to $T_r$ the acceleration increases from $-A$ to 0. FIG. 5B shows the corresponding radial velocity v of the scanning spot 21 and FIG. 5C shows the corresponding movement R of the scanning spot 21. As a result of this acceleration profile and a maximum permissible value of the acceleration of $A=A_0$, there is again a minimum radial displacement time $T_{r0}$ for a given radial distance R. By means of the method described with reference to FIG. 2 it is again possible to calculate a radial displacement time $T_r$ greater than the minimum radial displacement time $T_{r0}$ without this leading to a longer access time. The maximum value A of the acceleration is then limited to $A=T_r/T_{r0}*A_0$.

Figure 6:
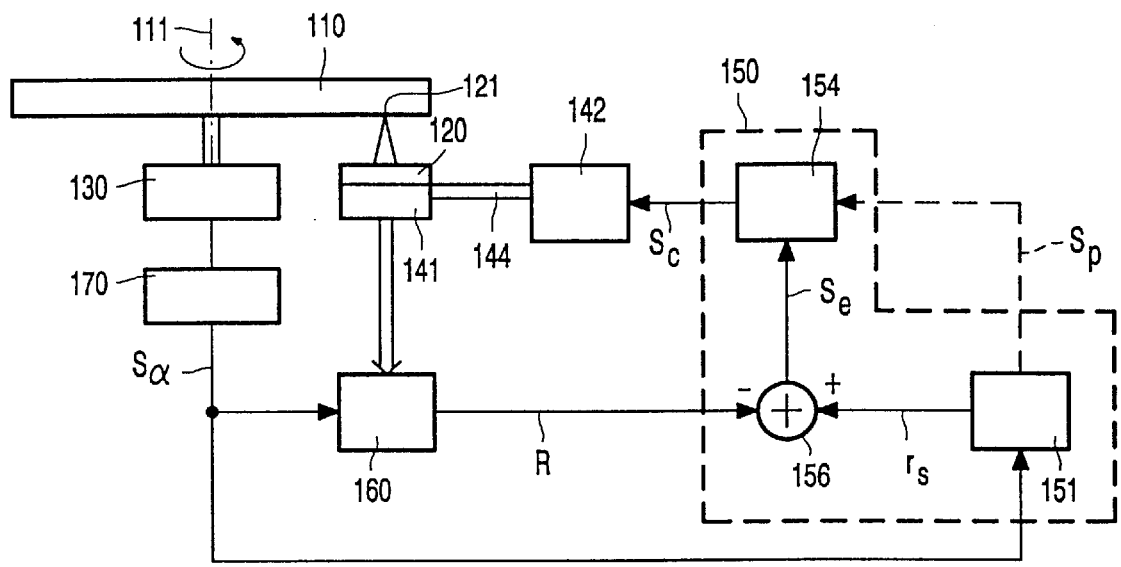
FIG. 6 shows a device in accordance with a second embodiment of the invention.
Figure 6A:
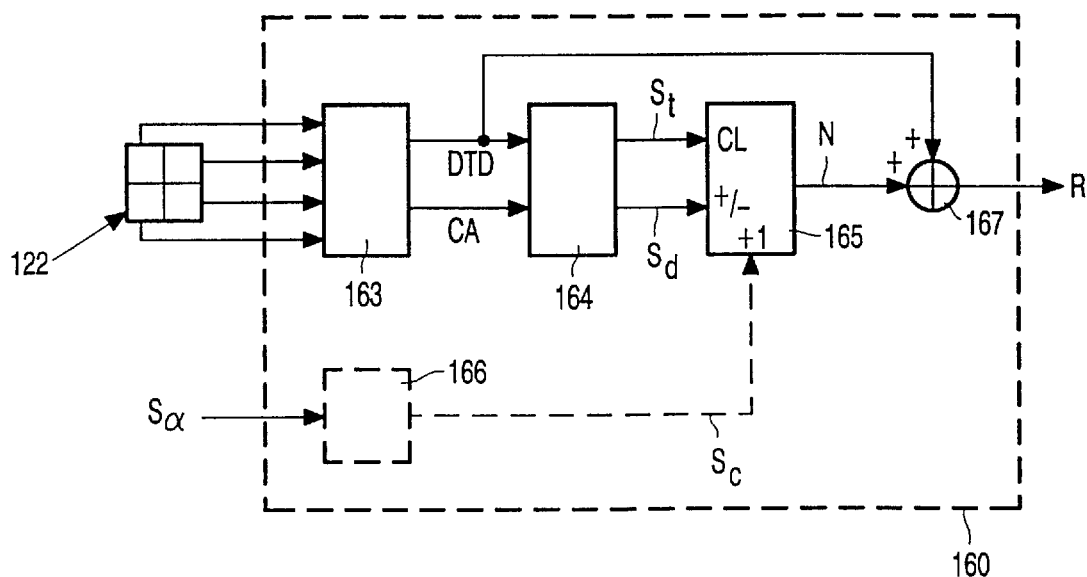
FIG. 6A shows a detail of the device shown in FIG. 6.

A second embodiment of the device in accordance with the invention is shown in FIG. 6. Parts therein which correspond to those in FIG. 1 have the same reference numerals incremented by 100. In the present embodiment the radial movement R of the scanning spot 121 is derived from the number of tracks crossed during the movement. For this purpose, the radial position measurement means 160 take the form shown in FIG. 6A. In this form the radial position measurement means 160 include a first arithmetic unit 163 which in response to the signals from a four-quadrant detector 122 generates a first and a second position signal, the two position signals being 90° shifted in phase with respect to one another. In the present case the signals are the central aperture (CA) signal and the differential time detection (DTD) signal. A second arithmetic unit 164 derives from the CA signal and the DTD signal a track crossing signal St, which indicates that a track is crossed, and a direction signal Sd, which is indicative of the direction in which the track is crossed. Track crossing counting means 165 generate a counting signal N which is indicative of the number n of tracks crossed. When a track is crossed in an outward direction the number n is incremented and when a track is crossed in an inward direction it is decremented. The device may include correction means 166 for deriving from the tangential position signal $S_\alpha$ a correction signal Sc for the track crossing counting means 165. In the case of an information carrier 110 having spiral tracks the second arithmetic unit 164 detects the crossing of a track in an inward direction at a fixed position of the scanning spot 121 during every revolution of the information carrier 110. This is based on the spiral direction and direction of rotation of the information carrier 110 which are customary in the CD standard. This erroneous detection can be compensated for by incrementing said number n by one for every full revolution of the information carrier 110. Incrementation is effected preferably at the instant at which the tangential position $\alpha$ of the scanning spot 121 coincides with the tangential end position $\alpha_e$. In the case that the information carrier 110 has separate concentric circular tracks the correction means 166 can be disabled. The signal generated by the counting means 165 provides information about the tracks between which the scanning spot 121 is located but does not give the exact location between these tracks. In order to calculate the location of the scanning spot 121 more accurately the device has means for generating a tracking error signal which is indicative of the distance of the scanning spot from the nearest track. In the present case said means are formed by the first arithmetic unit 163, the DTD signal serving as the tracking error signal. With the aid of combination means 167 a radial position signal R is generated from the counting signal N and the tracking error signal DTD. An error signal $S_e$ for the control means 154 is derived from the signal R and the signal $r_s$ which indicates the desired radial position. Said control means may receive a prediction signal $S_p$ as in the first embodiment.

Although the invention has been described with reference to preferred embodiments, the invention is not limited thereto. Thus, many variants are conceivable to one skilled in the art without departing from the scope of the invention as defined in the Claims. The invention, insofar as it is embodied in the apparatus, can be implemented by hardware as well as software means and different "means" may be materialized by the same hardware item. The use of the verb "to comprise" does not exclude the presence of elements other than those mentioned in a Claim. The use of the indefinite article "a" before an element does not exclude the presence of a plurality of such elements. The invention resides in any novel feature or combination of features.

What is claimed is:

1. A device for scanning an information carrier having tracks around an axis, which device has means for transferring information from/to a scanning spot on the information carrier and has tangential displacement means for moving the scanning spot in a tangential direction and radial displacement means for moving the scanning spot in a radial direction, which device has control means for controlling the radial displacement means and has radial position measurement means for generating a radial position signal ($\cos(9\beta_r)$, $\sin(9\beta_r)$) which is a measure of the instantaneous radial position of the scanning spot, which device has a scanning mode, in which the scanning spot follows a track, and a displacement mode, in which the scanning spot is moved in a radial direction and tracks are crossed, characterized in that the device further has tangential position measurement means for generating a tangential position signal ($S_\alpha$) which is indicative of the tangential position ($\alpha$) of the scanning spot, the control means causing the scanning spot to be moved in the radial direction in the displacement mode in a time interval with a radial displacement time ($T_r$) which is a function of the difference between a desired tangential position ($\alpha_e$) and a current tangential position ($\alpha_b$).

2. A device as claimed in claim 1, characterized in that the control means provide a movement of the scanning spot over a similar radial distance in a comparatively long first radial displacement time and a comparatively short second radial displacement time ($T_r$) for a comparatively small first difference and a comparatively large second difference ($\alpha_e-\alpha_b$) in tangential positions.

3. A device as claimed in claim 1, characterized in that the radial position measurement means include track crossing counting means for generating a counting signal (N) which is indicative of a number (n) of tracks crossed, means for generating a tracking error signal (DTD) which is indicative of the distance of the scanning spot from the nearest track, and means for generating a radial position signal (R) from the counting signal (N) and the tracking error signal (DTD).

4. A device as claimed in claim 3, further comprising correction means for correcting the counting signal (N) on the basis of the tangential position signal ($S_\alpha$).

5. A method of operating a device for scanning an information carrier having tracks around an axis, said method comprising;

rotating the information carrier about the axis;
transferring information in a scanning mode from/to a scanning spot on the information carrier such that the scanning spot is moved along a track;

moving the scanning spot in a displacement mode in a radial direction in which tracks are crossed;

generating a radial position signal which is a measure of the instantaneous radial position of the scanning spot; and generating a tangential position signal ($S_a$) which is indicative of the tangential position ($\alpha$) of the scanning spot;

characterized in that in the displacement mode the scanning spot is moved in the radial direction in a time interval with a radial displacement time ($T_r$) which is a function of the difference between a desired tangential position ($\alpha_e$) and a current tangential position ($\alpha_b$).

6. A device as claimed in claim 1, characterized in that the control means include first control means for generating a signal which is indicative of a desired instantaneous position of the scanning spot as a function of the time, second control means for generating an error signal which is indicative of a difference between the desired instantaneous position and the instantaneous position, and third control means for generating a control signal ($S_c$) for the radial displacement means (40).

7. A device as claimed in claim 6, characterized in that the control means include fourth control means for generating a prediction signal ($S_p$) which corresponds to an expected value of the control signal ($S_c$) and include signal combination means for generating the control signal ($S_c$) from the error signal and the prediction signal ($S_p$).

8. A device as claimed in claim 2, characterized in that the control means include first control means for generating a signal ($\beta_s$) which is indicative of a desired instantaneous position of the scanning spot as a function of the time, second control means for generating an error signal which is indicative of a difference between the desired instantaneous position and the instantaneous position, and third control means for generating a control signal ($S_c$) for the radial displacement means.

9. A device as claimed in claim 8, characterized in that the control means include fourth control means for generating a prediction signal ($S_p$) which corresponds to an expected value of the control signal ($S_c$) and include signal combination means for generating the control signal ($S_c$) from the error signal and the prediction signal ($S_p$).

10. The method of claim 5, further comprising;

moving the scanning spot over a similar radial distance in a comparatively long first radial displacement time; and moving the scanning spot a comparatively short second radial displacement time ($T_r$) for a comparatively small first difference and a comparatively large second difference ($\alpha_e - \alpha_b$) in tangential positions.

11. The method of claim 5, further comprising generating a counting signal (N) which is indicative of a number (n) of tracks crossed;

generating a tracking error signal (DTD) which is indicative of the distance of the scanning spot from the nearest track; and generating the radial position signal from the counting signal (N) and the tracking error signal (DTD).

12. The method of claim 11, further comprising correcting the counting signal (N) on the basis of the tangential position signal ($S_a$).

13. The method of claim 5, further comprising;

generating a signal which is indicative of a desired instantaneous position as a function of the time;

generating an error signal which is indicative of a difference between the desired instantaneous position and the instantaneous position, and generating a control signal ($S_c$) for the radial displacement means.

14. The method of claim 13, further comprising;

generating a prediction signal ($S_p$) which corresponds to an expected value of the control signal ($S_c$); and generating the control signal ($S_c$) from the error signal ($S_e$) and the prediction signal ($S_p$).

15. The method of claim 10, further comprising;

generating a signal which is indicative of a desired instantaneous position as a function of the time;

generating an error signal which is indicative of a difference between the desired instantaneous position and the instantaneous position, and generating a control signal ($S_c$) for the radial displacement means.

16. The method of claim 15, further comprising;

generating a prediction signal ($S_p$) which corresponds to an expected value of the control signal ($S_c$); and generating the control signal ($S_c$) from the error signal ($S_e$) and the prediction signal ($S_p$).

* * * * *